Oct. 23, 1923.
J. A. BRIED
FRICTION CLUTCH MECHANISM
Filed July 12, 1920
1,471,721
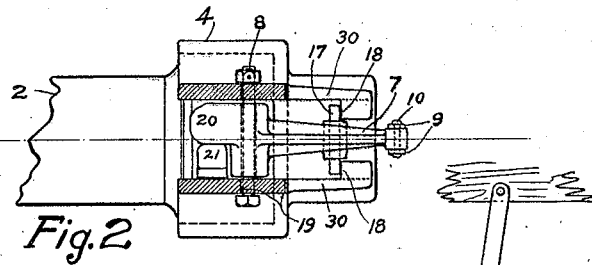
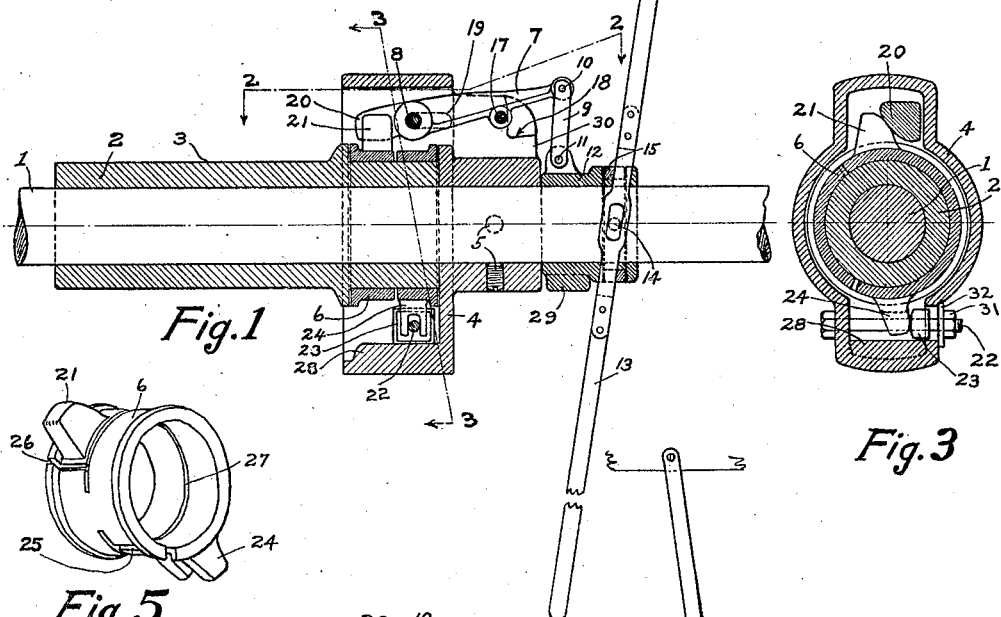
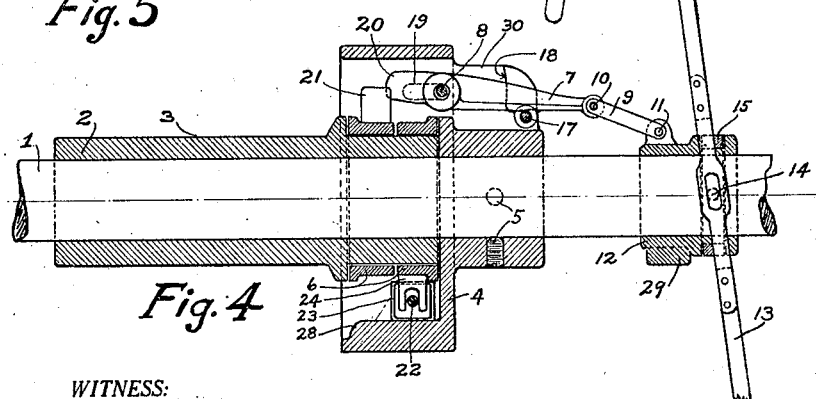
WITNESS:
C. L. Bried
S. L. Rogers
INVENTOR.
Julien A. Bried Patented Oct. 23, 1923.

1,471,721

UNITED STATES PATENT OFFICE.

JULIEN A. BRIED, OF OAKLAND, CALIFORNIA.

FRICTION-CLUTCH MECHANISM.

Application filed July 12, 1920. Serial No. 395,500.

*To all whom it may concern:*

Be it known that I, JULIEN A. BRIED, a citizen of the United States, residing at Oakland, in the county of Alameda and State of California, have invented a new and useful Improvement in a Friction Clutch Mechanism, of which the following is a specification and which is illustrated in the accompanying drawings.

This invention relates to improvements in friction clutches of the type used on factory lineshafts, and its principal object, which is applicable to various forms of such mentioned clutches, is to provide a greater release to the friction members, and to lock the clutch levers, of a non-balanced lever system, against the influence of centrifugal force, when in a released or disengaged position.

In the drawings accompanying this specification Fig. 1 is a longitudinal center cross section of my improved friction clutch mechanism, mounted on a shaft and showing the relation of all its parts, with the clutch in "engaged" position.

Fig. 2 is a cross section of the upper part of the clutch only, taken along the line 2—2 of Fig. 1.

Fig. 3 is a cross section of Fig. 1 taken along the line 3—3.

Fig. 4 is a similar view to Fig. 1, but shows the clutch with its mechanism in "disengaged" position.

Fig. 5 is a perspective sketch of the contractible ring friction member.

The exact nature of my invention will be readily understood by a more detailed reference to the drawing, as follows,—

In Fig. 1 is shown at 1 a shaft carrying the various friction clutch members, and with which shaft all the members are adapted to rotate when the clutch is in engagement, as shown in this figure.

And, while this invention has to do principally with a means of locking down, or in released position, the clutch levers, and is applicable to several different forms of friction clutches, it is here shown applied to a common contracting ring type of friction clutch.

At 2 in Fig. 1 is shown a sleeve, loose upon the shaft, and adapted to receive on its outer surface 3, a pulley, gear, sprocket, or whatever it is desired to mount thereon, according to the use to which the clutch will be put. At 4 is shown a carrier member affixed to the shaft by means of the set screws 5. The carrier member carries a contractible friction ring member 6 adapted to be contracted by the clutch mechanism upon one end of the sleeve.

A pressure lever 7, also supported on the carrier, has a wedge shaped end 20 adapted to engage a curved lug 21 formed on one end of the friction ring 6.

The pressure lever 7 is pivoted to the carrier by means of a bolt 8 passing through both lever and carrier, and is moved up and down through means of the links 9, pivoted at one end 10 to the outer end of the lever, and at the other end pivoted at 11 to a sliding collar 12.

The sliding collar is slid or moved axially along the shaft by means of an ordinary hand lever 13, pivotally attached at 14 to a yoke 15 freely bearing in a groove in the sliding collar 12.

When the sliding collar is moved to the right, it will, by reason of the link connection described, pull down the outer end of the pressure lever and release or disengage the clutch. But should the rotated speed of the clutch be high, centrifugal force acting both on the lever 7 and the links 9 would immediately draw the sliding collar toward the carrier 4, and throw the clutch back into partial if not total engagement.

The usual method of overcoming this tendency in a clutch having an unbalanced lever system similar to the one shown, is to provide springs to stabilize the lever 7 when released, but I provide a positive lock to hold the lever in released position, regardless of the action of centrifugal force.

This lock consists of a pin 17, loosely passed through the lever and projecting from both sides. This pin operates against the edges of two lugs 18 cast on ribs 30 on the carrier 4, and when lever 7 is pulled down by means of the sliding collar as described, a further movement of the collar to the right draws the pressure lever bodily in an axial direction and locks the ends of the pin 17 under the lower edges of the lugs 18, thus positively holding the lever in released position against any action of centrifugal force. The lever 7 is shown in such a locked position, with clutch disengaged, in Fig. 4.

To permit of the bodily moving of the lever 7 in an axial direction (in direction of shaft length), the fulcrum pin 8 passing through the lever 7 is fulcrumed to the carrier in slots 19.

These slots 19 and also the lugs 18 which engage the ends of the pin 17, are more clearly shown in Fig. 2.

Upon moving the sliding collar to the left or toward the carrier 4, the lever 7 is first forced along bodily in an axial direction until its fulcrum pin 8 reaches the end of the slots 19 and its curved pressure end 20 contacts with the lug 21 on the contractible friction ring 6, after which a further movement of the sliding collar to the left causes the outer end of the lever to rise to the position shown in Fig. 1 and wedge the pressure end tightly back of the lug 21 on the friction ring and contract the latter upon the sleeve 2, and thus bring the clutch into engagement, so that the sleeve will revolve as a unit with the carrier, upon rotating the shaft.

The general form of the pressure end of the lever 7 is shown in cross section in Fig. 3 at 20, and the lug formed on the ring with which it cooperates, is shown at 21.

To provide for adjustment or taking up the wear on the inner surface of the ring 6, through use, I provide a bolt 22 passing through the carrier and also through a slotted lug 24 formed on the other free end of the friction ring 6. Bearing against the lug 24 is a traveling threaded nut 23 actuated by the bolt mentioned. The bolt is locked by the nut 31 bearing against the washer 32.

The form of the contractible ring 6 can be easily understood by referring to the perspective sketch of same in Fig. 5, and which also shows the relation of the pressure receiving lug 21, to the adjusting lug 24. The ring is of a spiral nature, being slotted inwardly from both sides as shown at 25 and 26, and also along its center for a distance to give it resiliency, as shown at 27.

It will be observed that I have shown a "single lever" clutch which normally would, for this very reason, be considerably out of balance under high rotative speeds. But this is overcome by the increased thickness of metal cast on the carrier at the position 28, and on the sliding collar at 29, and which extra metal acts as a counterweight to balance the weight of the lever and links diametrically opposite those points. Though if desired, this same style of clutch can be made with two levers at diametrically opposite points, and the friction ring divided into two halves with separate adjusting screws for each half, or three or four levers may be used similarly on larger clutches. Such symmetrical arrangements avoid the necessity of counterweighting as described, and also make it easy to divide or "split" the clutch, as it is termed in the art and are common to all clutches operated through pressure levers. These many modifications will be readily understood by anyone familiar with such devices, and my particular improvement, the pulling down of a clutch lever and then locking of same in released position by bodily sliding it to another position under a locking lug, will be seen to be applicable to all such modifications as well as to any other style of a friction clutch having a pressure lever operating in a similar position and plane as the one herein shown.

I claim:—

1. A friction clutch comprising a carrier member, a clutch pressure applying lever pivotally and slidably mounted on said carrier member, a lever locking device on said carrier member, a sliding collar linked to the pressure applying lever and adapted to be slid in one direction to bodily shift the lever from engagement with said lever locking device and to engage the clutch and to be slid in the opposite direction to disengage the clutch and bodily move the lever into engagement with the leved locking device.

2. In a rotary friction clutch, means for engaging and disengaging the clutch comprising a pressure applying lever pivotally and slidably mounted on the clutch, a lever locking device on the clutch, and means for actuating the pressure applying lever to engage and disengage the clutch and to slide the lever bodily and engage it with the lever locking device.

JULIEN A. BRIED.

Witnesses:
 JAMES M. LEAVER, Jr.,
 C. L. WALTER.